Figure 1:
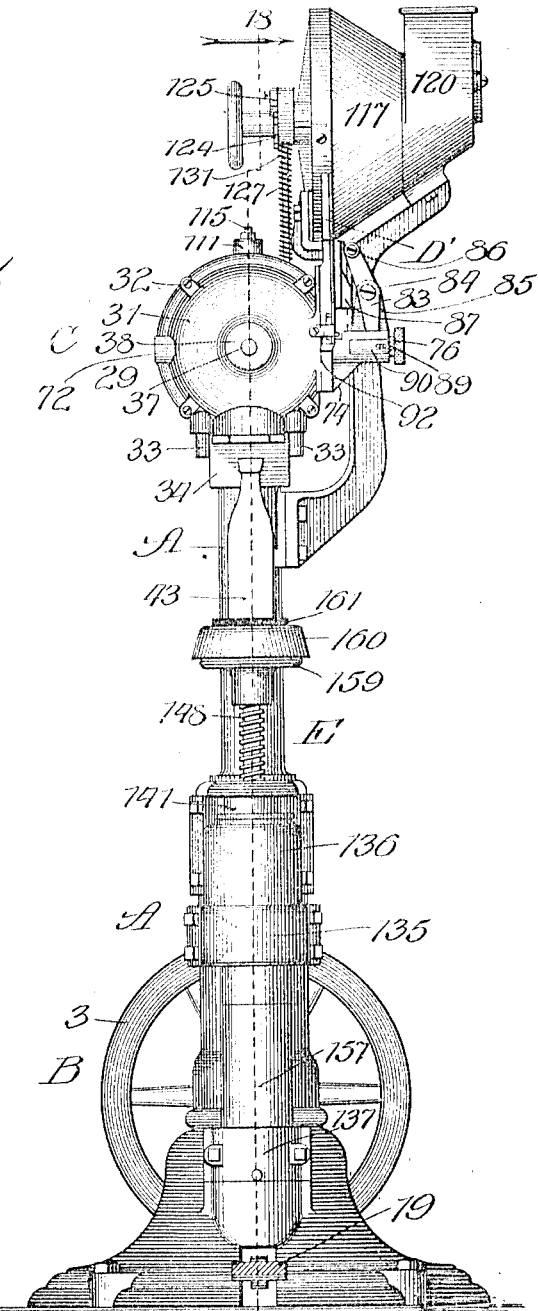

H. M. BROWN.
STOPPERING OR SEAL APPLYING MACHINE.
APPLICATION FILED NOV. 7, 1911.

1,040,615.

Patented Oct. 8, 1912.

10 SHEETS—SHEET 1.

Witnesses:
Inventor:
Harry M. Brown,

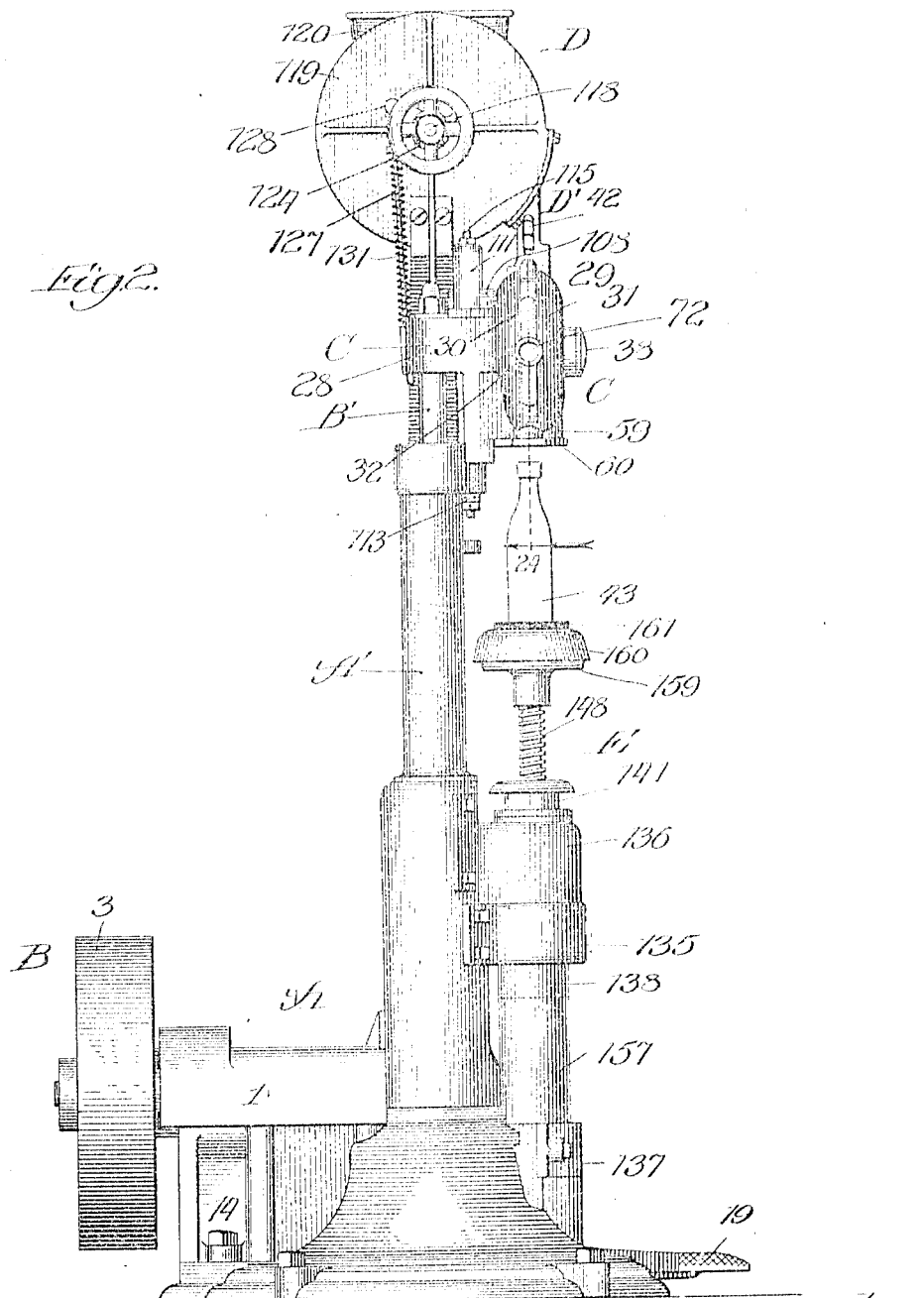

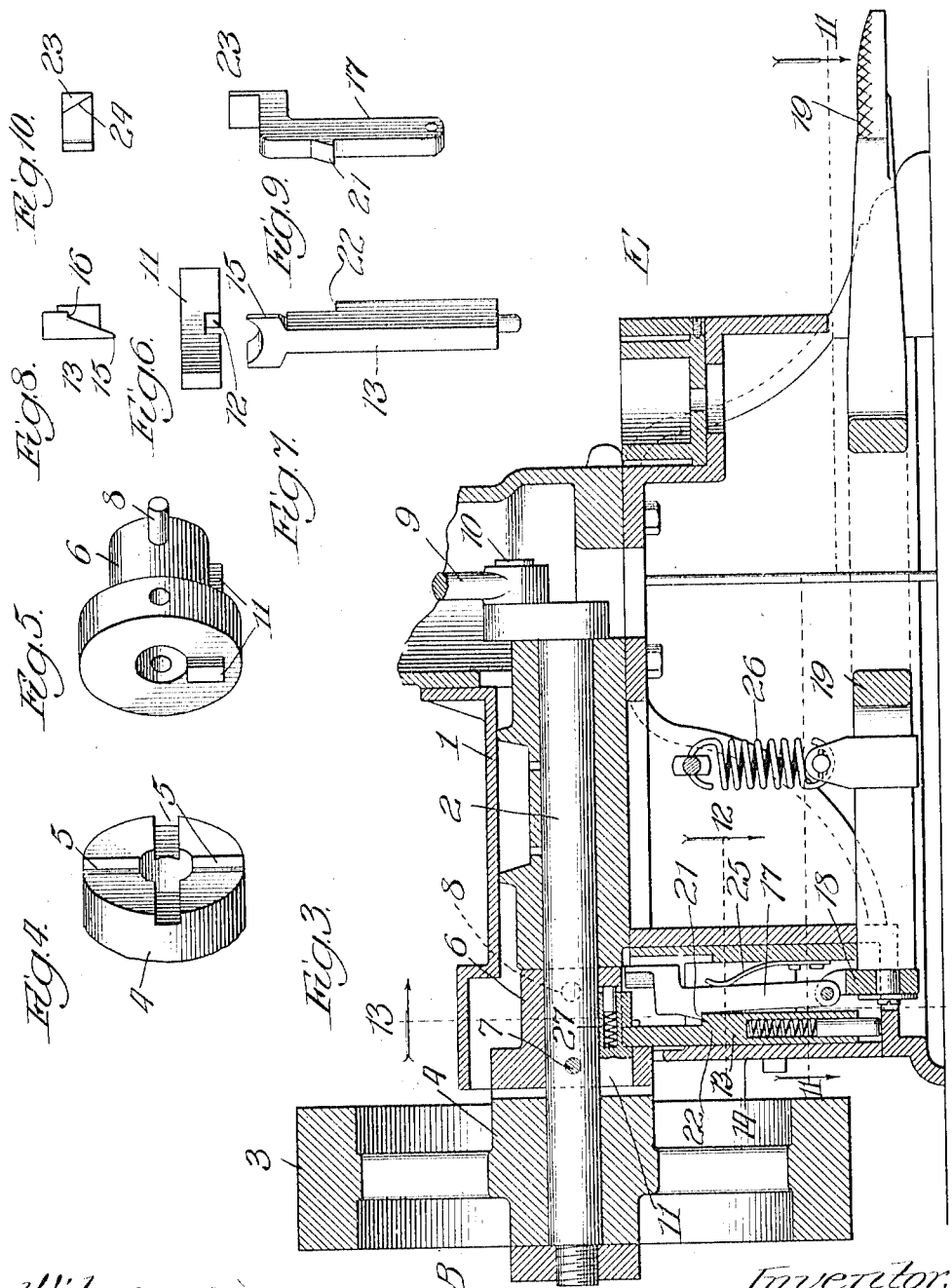

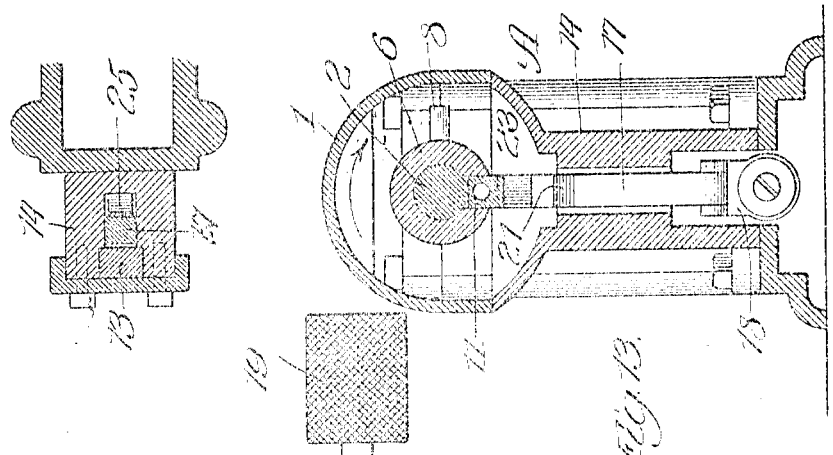
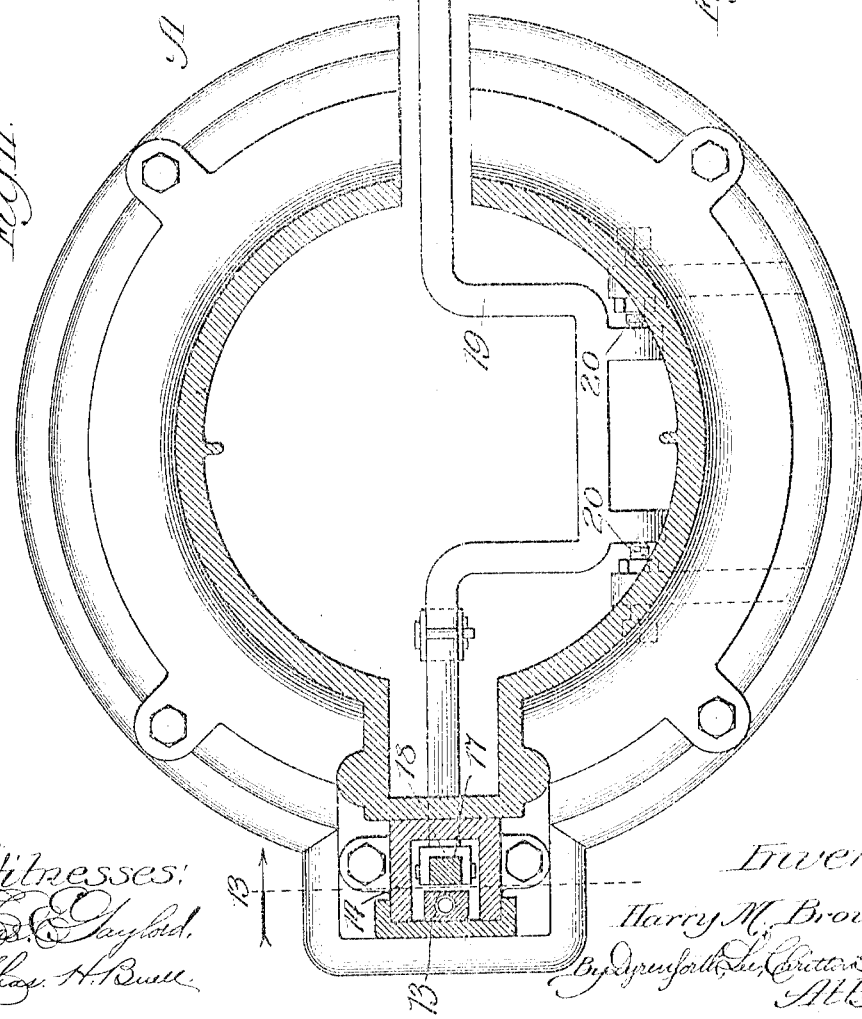

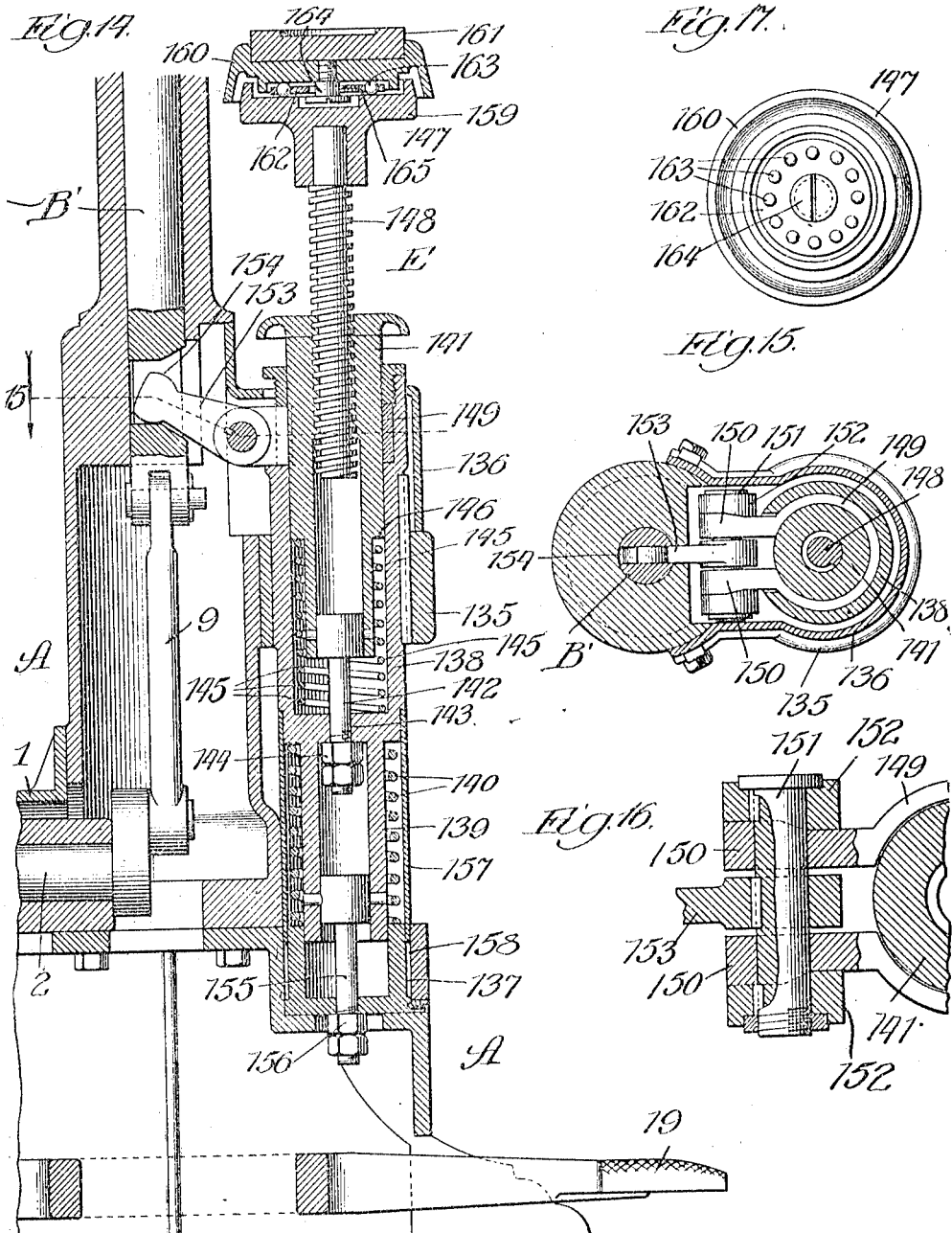

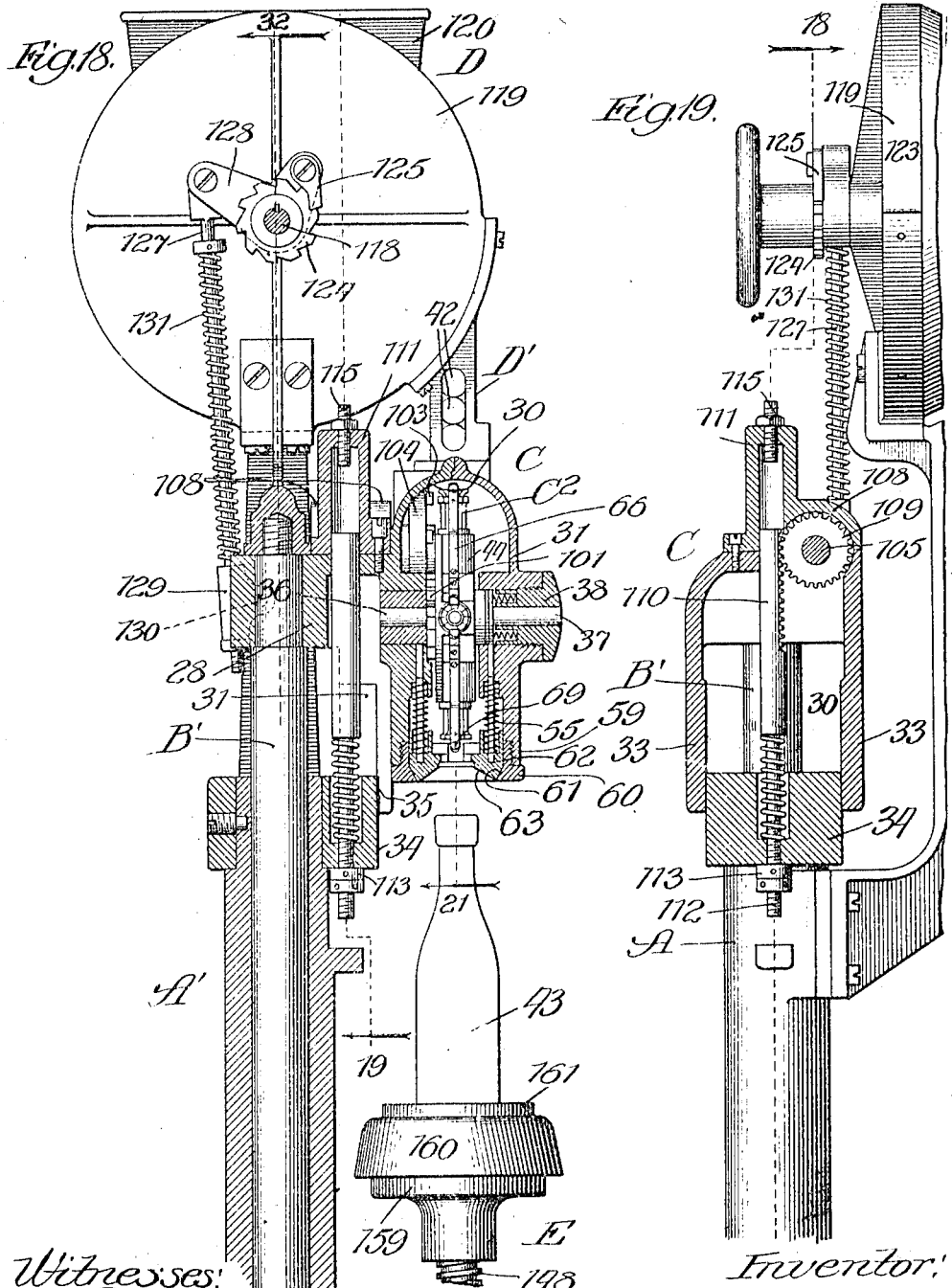

H. M. BROWN.
STOPPERING OR SEAL APPLYING MACHINE.
APPLICATION FILED NOV. 7, 1911.
1,040,615.
Patented Oct. 8, 1912.
10 SHEETS—SHEET 7.
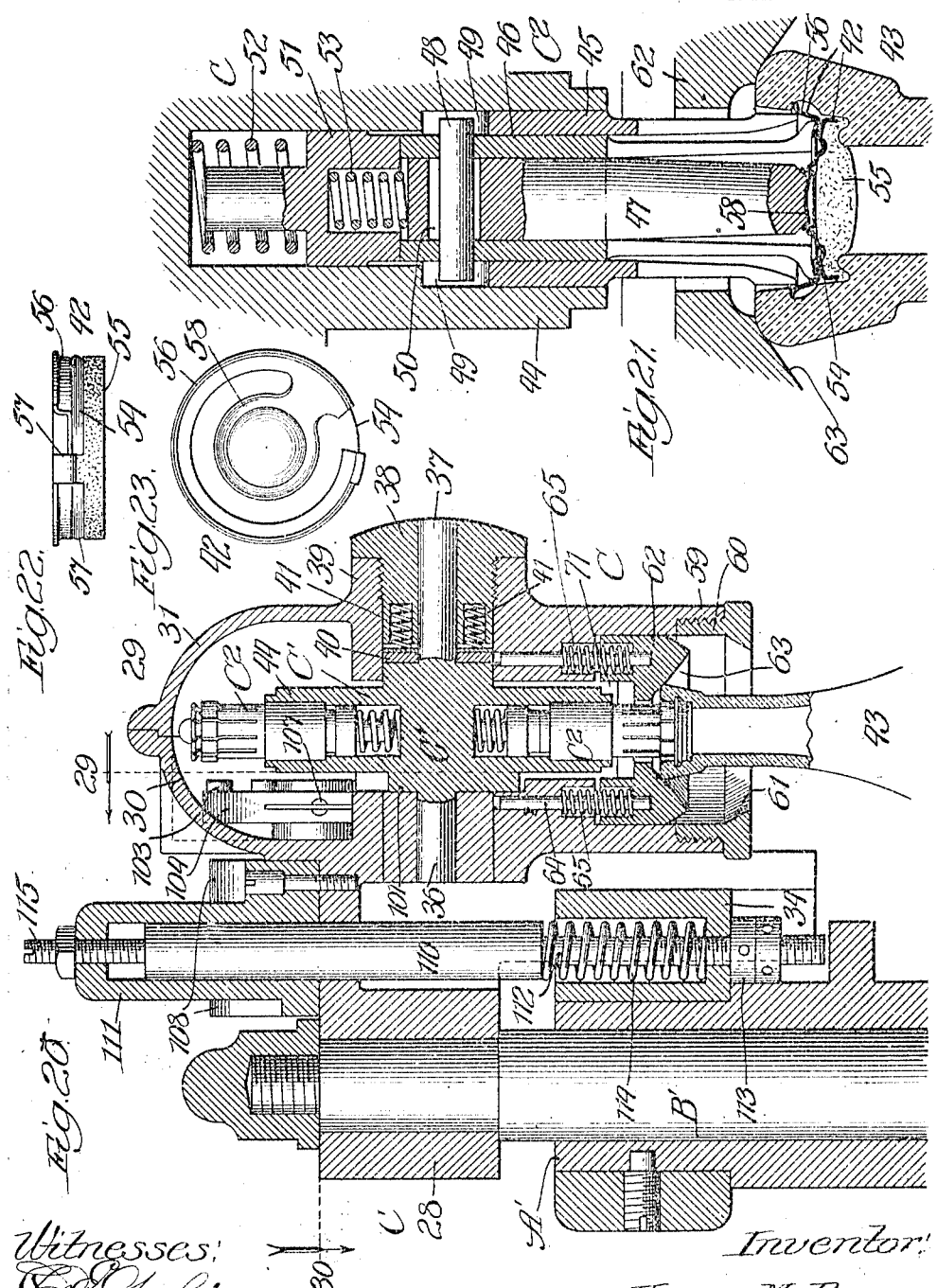
Witnesses:
Inventor:
Harry M. Brown,

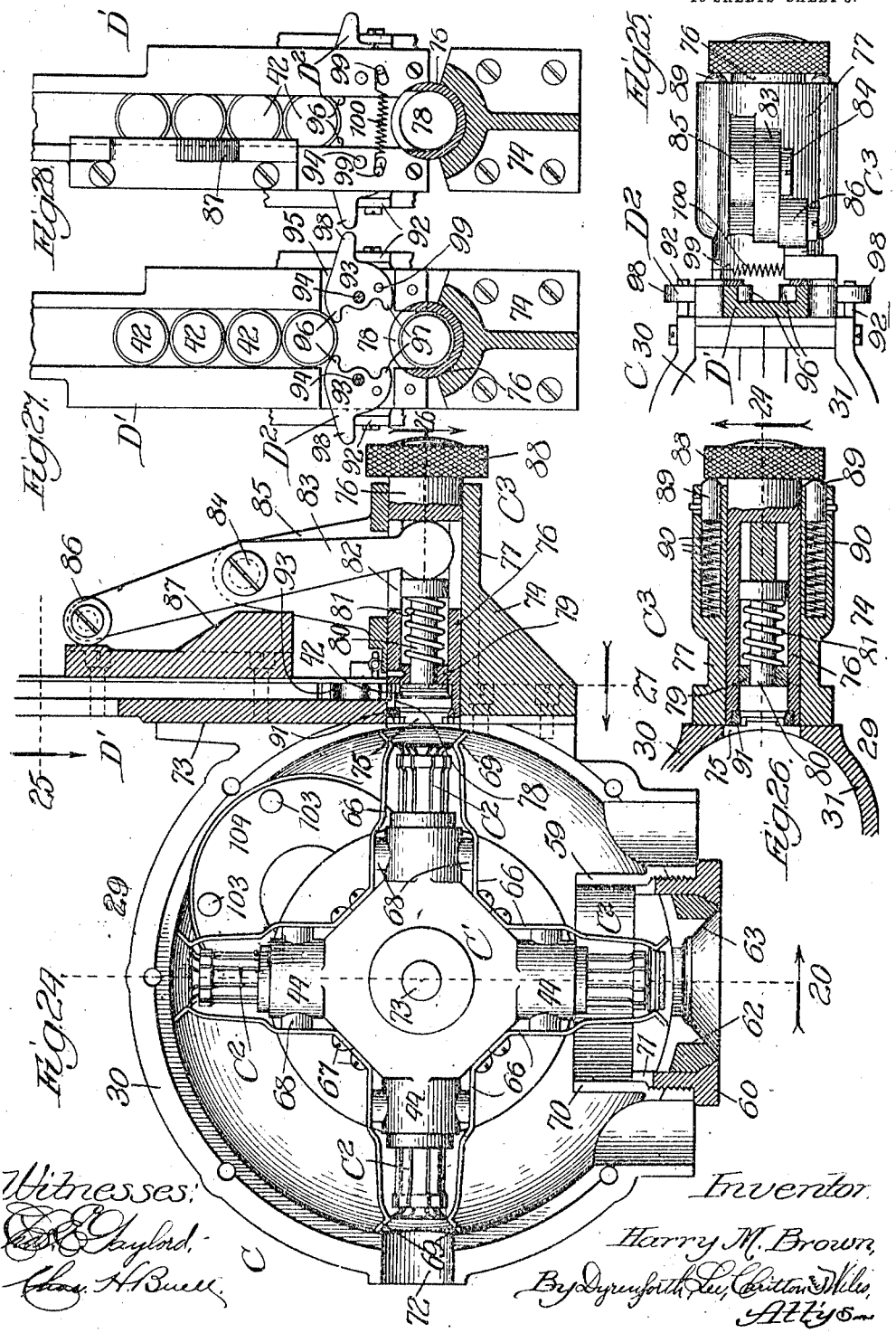

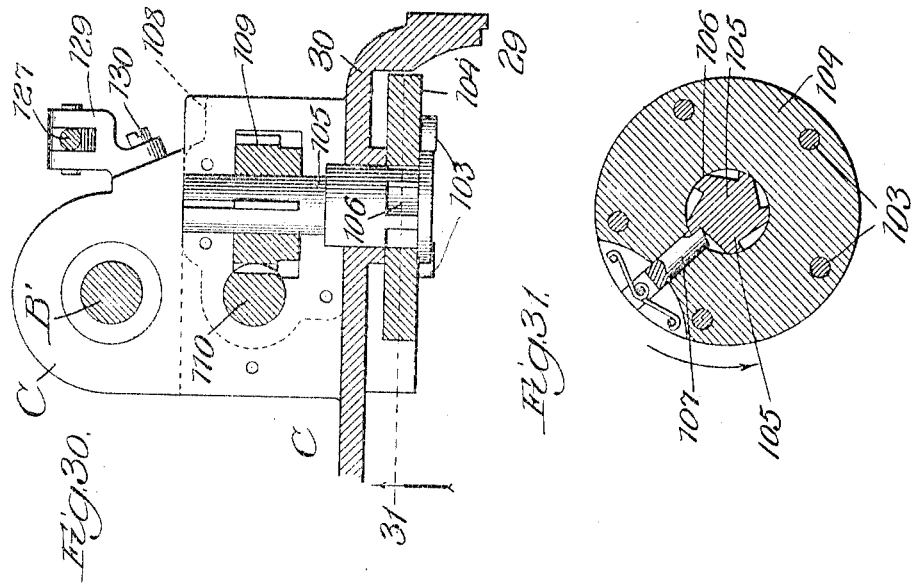
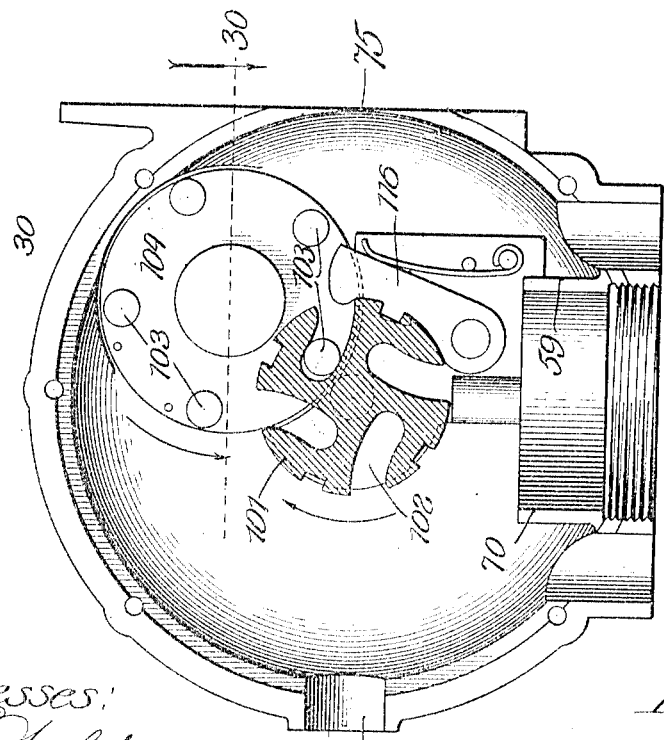

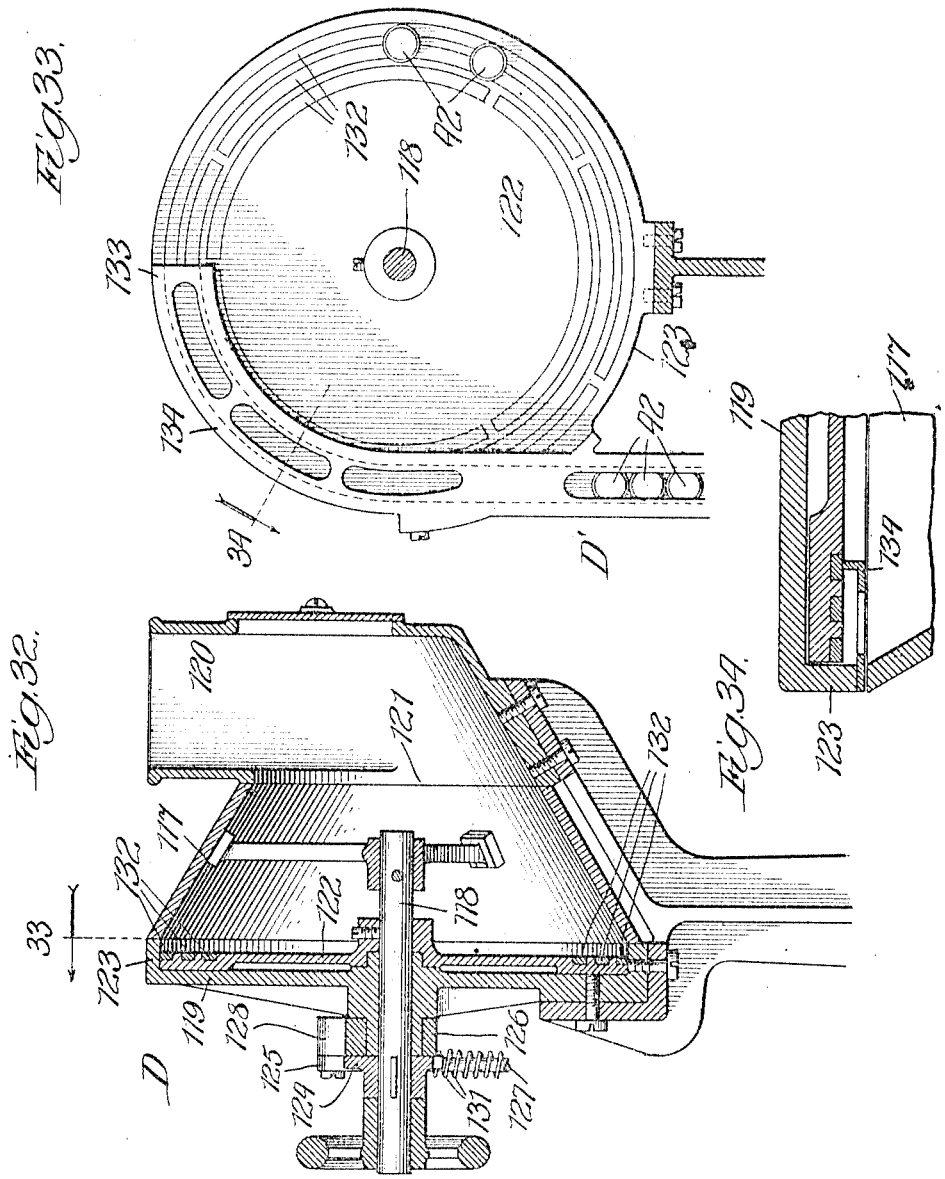

UNITED STATES PATENT OFFICE.

HARRY M. BROWN, OF BROOKLYN, NEW YORK, ASSIGNOR TO RICHARD A. CANFIELD, OF PROVIDENCE, RHODE ISLAND.

STOPPERING OR SEAL-APPLYING MACHINE.

1,040,615. Specification of Letters Patent. Patented Oct. 8, 1912.

Application filed November 7, 1911. Serial No. 659,067.

*To all whom it may concern:*

Be it known that I, HARRY M. BROWN, a citizen of the United States, residing at Brooklyn, in the county of Kings and State of New York, have invented a new and useful Improvement in Stoppering or Seal-Applying Machines, of which the following is a specification.

My invention relates particularly to machines adapted to apply seals or stoppers to bottles; and my primary object is to provide a machine of improved general construction having large capacity and provided with improved means for self-adjustment to accommodate bottles of varying length.

In the preferred construction, which is illustrated, there are employed a self-adjusting bottle-supporting a vertically reciprocating revoluble tool-head equipped with a plurality of seal-applying tools; means for intermittently rotating the tool-head through a given arc during the rising movement of the tool-head; means for selecting seals or stoppers in bulk and delivering them to an escapement; and means carried with the tool-head and serving, in the descent of the tool-head, to deliver a seal to an idle tool, while a previously supplied tool serves to apply a seal to the bottle. The driving mechanism is equipped with a clutch-device having a sliding key which is permitted to move into engagement with the driving pulley when a foot-lever is depressed, and is automatically retracted to disengage the clutch when the driving-shaft completes a revolution.

The invention is illustrated in its preferred embodiment in the accompanying drawings, in which—

Figure 1 represents a front elevational view of the improved machine; Fig. 2, a side elevational view of the same; Fig. 3, an enlarged broken vertical section taken as indicated at line 3 of Fig. 1; Fig. 4, a broken perspective view showing an inner face of the hub of the driving-wheel; Fig. 5, a perspective view of a collar with which the driving-shaft is equipped and a sliding clutch-member, or key, which moves in said collar; Fig. 6, a perspective view of said key; Fig. 7, a perspective view of a key-retracting dog which operates as a part of the mechanism shown in Fig. 3; Fig. 8, a plan view of the same; Figs. 9 and 10, perspective and plan views, respectively, of a pawl which serves to retract the dog shown in Fig. 7; Fig. 11, a plan section taken as indicated at line 11 of Fig. 3; Fig. 12, a broken plan section taken as indicated at line 12 of Fig. 3; Fig. 13, a vertical section taken as indicated at line 13 of Fig. 3; Fig. 14, an enlarged broken vertical section taken as indicated at line 3 of Fig. 1 and showing the self-adjusting mechanism with which the bottle-support is equipped; Fig. 15, a section taken as indicated at line 15 of Fig. 14; Fig. 16, a broken section similar to Fig. 15 and showing a detail of the automatically actuated clamping device employed; Fig. 17, a bottom view of the bottle-supporting plate; Fig. 18, a broken section taken as indicated at line 18 of Fig. 1, this view showing in detail the tool-head and manner of mounting it; Fig. 19, a section taken as indicated at line 19 of Fig. 18; Fig. 20, an enlarged broken section taken as indicated at line 20 of Fig. 24; Fig. 21, a broken sectional view taken as indicated at line 21 of Fig. 18, and showing a stoppering-tool in the operation of applying a seal; Figs. 22 and 23, elevational and plan views, respectively, of the stopper or seal which the stoppering-tools illustrated are particularly adapted to insert; Fig. 24, a broken sectional view taken as indicated at line 24 of Fig. 2; Fig. 25, a broken section taken as indicated at line 25 of Fig. 24; Fig. 26, a section taken as indicated at line 26 of Fig. 24; Figs. 27 and 28, a section taken as indicated at line 27 of Fig. 24, illustrating the operation of the escapement device which delivers stoppers to the stopper-feeding mechanism carried with the reciprocating tool-head; Fig. 29, a section taken approximately as indicated at line 29 of Fig. 20 and showing the detail of the means for rotating the tool-head; Fig. 30, a broken plan section taken as indicated at line 30 of Fig. 29; Fig. 31, a section taken as indicated at line 31 of Fig. 30; Fig. 32, a broken section taken as indicated at line 32 of Fig. 18; Fig. 33, a section taken as indicated at line 33 of Fig. 32; and Fig. 34, a broken section taken as indicated at line 34 of Fig. 33, the Figs. 32, 33 and 34 serving to illustrate the rotary stopper-chamber and magnetic selecting devices with which it is equipped.

In the construction illustrated, A represents a frame having a hollow standard A'; B, driving mechanism serving to actuate a vertically moving plunger B' which projects above the upper end of the standard A'; C, a cross-head or slide mounted on the upper end of the plunger B' and serving to house a revoluble tool-holder C' which is equipped with a plurality of radially disposed seal-applying tools C²; C³, a stopper-feeding device carried with the cross-head C and serving to deliver stoppers to the idle tools as they pass progressively to the stoppering position; D, mechanism adapted to select stoppers or seals from bulk and deliver them, through a chute D', to an escapement device D² which is disposed normally just above the device C³; and E, a bottle-supporting device equipped with means for automatically adjusting itself to accommodate bottles of varying length, so that the same amount of sealing pressure will be exerted, regardless of the length of the bottle.

The frame A may be of any suitable construction. It has an enlarged base portion 1, on which is mounted the driving mechanism B.

The driving mechanism B comprises a shaft 2 on which is mounted a loose pulley 3 having a hub 4 provided in its inner face with radial slots 5; a sleeve or collar 6 secured on the shaft 2 by means of a pin 7, said sleeve being equipped with a cam-pin 8; a connecting rod 9, joining a crank 10 with which the shaft 2 is equipped, to the lower end of the plunger B'; a sliding key or clutch member 11 movable in a slot with which the collar 6 is provided and adapted to engage any one of the recesses 5, said key being provided with a transverse slot 12; a vertically-movable, spring-held, key-retracting dog 13 movable in a guide 14 with which the base portion of the frame is equipped, said dog having its upper end provided with a sharp edge 15 adapted to engage the slot 12 of the key 11, the wedge portion having at its base a shoulder 16 adapted to engage a lateral surface of the key after retraction and stop the rotation of the shaft; a dog-withdrawing pawl 17 connected by a link 18 with a foot-treadle 19 which is adapted to rock on pivots 20, as shown in Fig. 11, said member 17 having a projection 21 adapted to engage a shoulder 22 with which the dog 13 is provided, and said member 17 having also an upward extension 23 provided with a beveled surface 24 adapted to be engaged by the cam-pin 8; a spring 25 housed in the guide 14 and adapted to throw the pawl 17 into engagement with the dog 13; and a spring 26 serving to hold the rocking foot-treadle normally in the elevated position, in which position the pawl 17 is in operative engagement with the dog 13, while the dog 13 is in engagement with, and serves to hold retracted, the sliding clutch-member 11. When the foot-treadle is depressed, the dog 13 is withdrawn through the medium of the member 17, thereby allowing the clutch-member 11, which, as shown in Fig. 3, is equipped with a spring 27, to be thrown into engagement with one of the recesses 5 of the hub 4 of the driving-wheel. When this occurs, the shaft 2 makes a rotation, whereupon the cam-pin 8, engaging the extension 23 of the pawl 17, disengages the pawl from the dog 13, and allows the dog to turn again to the key-retracting position.

The cross-head C has an attaching shank or collar-portion 28 which is securely fastened on the upper end of the plunger B', and has a housing 29 in which the revoluble tool-holder C' is journaled, said housing 29 comprising a rear section 30 which is preferably formed integrally with the shank portion 28, and a front section 31 which is detachably secured to the section 30, as by means of screws 32. The rear section 30 is provided on the rear side of its lower portion with flanges which afford lateral bearings 33 which engage the lateral surfaces of a guide-member 34 (Figs. 18 and 19) with which the upper end of the standard A' is equipped. The member 34 has flat side faces for engagement with bearings 33 of the cross-head and has a flat front face for engagement with a corresponding flat surface 35 with which the cross-head is provided. Thus, the cross-head is carried and guided by the plunger 28 and is also guided by the member 34.

The revoluble tool-head C' is provided with a rear axle 36 and a front axle 37, the former journaled in the rear housing-section 30, and the latter journaled in the front housing-section 31. The bearing for the axle 37 comprises a removable member 38 which has screw connection with a perforate boss 39 with which the front housing-section is provided. Washers 40 (Fig. 20) are interposed between the inner end of the bearing 38 and the body of the tool-carrier C'; and springs 41, accommodated by sockets with which the inner end of the member 38 is provided, press against the adjacent washer.

The tools C² are of a form particularly adapted to insert a stopper 42 (shown in Figs. 21, 22 and 23) into the mouth of a bottle 43. The tool-holder C' has four radial projections 44 with which the stopper-tools C² are connected. Each stoppering-tool comprises (Fig. 21) an outer tubular member 45 which is fixedly secured in a socket in a radial projection 44 of the tool-holder and provided at its other extremity with resilient fingers; an inner tubular member 46 extending through the member 45 and slidably related thereto, the member 46 being provided at its outer end with resilient fingers; and a central plunger 47 within the member 46 and slidable with relation thereto, the member 47 having a concave outer end adapted to engage the convex portion of the tab of the stopper 42. The member 46 is fitted near its inner end with a transverse pin 48 whose end portions are movable in slots 49 with which the inner end of the member 45 is provided. The pin 48 extends loosely through a slide 50 with which the plunger 47 is provided. The inner end of the member 46 abuts against a movable plug 51 which bears against a spring 52 confined in the socket with which the member 44 is provided. The member 51 has a socket containing a spring 53 against which the upper end of the centering member 47 bears.

The general construction of the stoppering-tools employed is now well known, and not claimed herein.

The stopper or seal 42 comprises a metal cap 54 having a downturned flange which is clenched upon the upper portion of the cork disk or sealing medium 55; and surmounting the cap 54 is an up-flanged retaining ring 56 adapted to engage an internal groove in the bottle-mouth, as shown in Fig. 21. The retainer ring, or locking ring, 56 is formed integrally with the cap 54, being connected therewith by a web 57. The cap 54 and the central tab or handle 58 with which the retainer ring is equipped are provided with suitable circular corrugations, whereby the tab will be centered on the cap; and the tab is bowed upwardly centrally to engage the concave lower surface of the central plunger 47 of the stoppering-tool, as shown in Fig. 21.

The housing 29, as before indicated, is rigidly mounted on the upper end of the plunger B', and has at its lower side a tubular projection 59 into which is screwed a bearing-sleeve 60 provided with a tapering seat 61, upon which is normally seated an annular spring-held bottle-centering member 62. The member 62 is adapted to move vertically within the bore of the tubular part 59 and bearing 60, and has a concave or conical lower surface 63 adapted to engage and center the mouth of the bottle. The member 62 is fitted with upwardly projecting studs 64 encircled by springs 65 which are housed in sockets with which the member 59 and member 62 are provided. When the cross-head C and tool-holder C' descend in the stoppering operation, the member 62 encounters the bottle and is lifted thereby, while the stoppering-tool serves to force the stopper into the mouth of the bottle. At each stoppering-tool is provided a pair of stopper-grippers 66, which are shown as comprising spring-arms securely mounted on the tool-carrier C', as by means of screws 67, the members 66 bearing, adjacent their attached ends, on lateral lugs 68 with which the sockets 44 are equipped. The members 66 are provided with diverging extremities 69 adapted to engage the stoppers. The tubular portion 59 projects into the housing, as shown in Fig. 24, and is slotted, as indicated at 70, to permit rotation of the member C'. The vertically movable bottle-centering device 62 is likewise slotted, as indicated at 71, to permit such rotation.

The casing or housing 29 is provided at the end of one horizontal diameter with an opening 72 through which the tools may be viewed, as they are turned in succession to that point. At the opposite lateral edge of the housing is a flat vertical surface 73, the upper portion of which makes sliding contact with the adjacent surface of the lower portion of the stopper-chute D'. On the lower portion of the flat surface 73 is mounted a bracket 74 which forms a part of the stopper-feeding mechanism which is carried with the cross-head C. The flat surface 73 intersects or cuts away the right-hand portion of the housing, affording an opening 75 adapted to admit the inner end of a sleeve 76 which is capable of limited reciprocation in a tubular portion 77 of the bracket 74. The inner portion of the sleeve 76 is provided at its upper side with a slot 78 which normally registers with the lower end of the chute D', as shown in Fig. 27, and serves to permit the stoppers to drop into the sleeve 76. Adjacent the slot 78 and at the outer side thereof, the tube 76 is fitted with a rigidly secured bearing 79 which receives the inner end of a stopper-feeding plunger 80, whose outer end is provided with a head between which and the bearing 79 is confined a relatively stiff spring 81. The sleeve 76 and tubular member 77 are slotted, as indicated at 82, to admit the lower end of a plunger-actuating lever 83 which is mounted on a pivot 84 carried by a bracket-member 85 which extends upwardly from the tubular member 77. The upper end of the lever 83 is equipped with a cam-roller 86 adapted to engage a cam 87 with which the lower end of the fixed feed-chute D' is equipped. The sleeve 76 projects at its outer end beyond the outer end of the tubular member 77 and is provided with a flanged head 88 which engages spring-held plungers 89 with which the tubular member 77 is equipped, as shown in Fig. 26. The springs 90 against which the members 89 bear are relatively light springs. When the cross-head C descends, the cam 87 serves to actuate the lever 83, thereby forcing the plunger 80 inwardly; and, owing to the stiffness of the spring 81, the sleeve 76 is carried inwardly and caused to enter the mouth 75 of the housing 29. After a limited movement of the sleeve 76, its head engages the outer end of the tubular member 74, and thereafter the spring 81 is compressed and the plunger moved relatively to the sleeve 76, thus carrying the stopper 42 into engagement with the spring-grippers 66 of the tool which happens to be in position to receive the stopper. As appears from Fig. 26, the inner end of the sleeve 76 is fitted with a ring 91 of slightly contracted diameter, so that the stopper will not topple inwardly, but will be forced evenly through the ring 91 when the plunger 80 moves inwardly. It is to be borne in mind that the retainer-ring, or locking-ring, 56 of the stopper is somewhat resilient, so that the plunger 80 will readily force the stopper through the ring 91. The members 66, of course, engage the retainer-ring of the stopper. The housing C is equipped, at points flanking the mouth 75, with projections 92 adapted to operate the escapement $D^2$ when the housing returns to the upper end of its traverse. Said projections are clearly shown in Fig. 25.

The escapement $D^2$ comprises, as shown in Figs. 27 and 28, a pair of trip-members, or pawls, 93 mounted on pivots 94, in slots 95 in the edge walls of the stopper-chute D'. Each member 93 has an upper tooth 96 and a lower tooth 97 adapted to engage the stoppers. Each member 93 also has an actuating arm 98 adapted to be engaged by one of the projections 92 carried by the cross-head C. From the lower portion of each member 93 projects a stud 99 which extends through a slot in the wall of the chute. The studs 99 are connected by a spring 100. Thus, the lowermost tooth 97 of the members 93 is normally held in position to engage the lowermost stopper 42; and when the cross-head C ascends, the members 93 are turned on their pivots and the teeth 96 are caused to enter between the lowermost stopper and the next adjacent stopper, while the teeth 97 are withdrawn and permit the lowermost stopper to drop through the slot 78 into the sleeve 76.

The rotation of the tool-head C' is directly accomplished through the medium of a wheel 101 (Figs. 18 and 29), which, as shown in Fig. 20, may be formed integrally with the hub portion of the tool-head C'. The wheel 101 is provided peripherally with a series of cam-slots 102 adapted to be engaged by laterally projecting studs 103 carried by a wheel 104 (Figs. 29 and 30) which is mounted on the front end of a shaft 105 journaled in the rear housing section 30. As shown in Fig. 31, the shaft 105 is provided with ratchet-teeth 106 engaged by a spring-held pawl 107 with which the wheel is equipped, so that when the shaft is rotated in one direction the wheel will be advanced, and when the shaft is rotated in the opposite direction the pawl will slip idly over the ratchet-teeth. The rear end of the shaft 105 is journaled in a combination bearing and housing 108 and equipped with a rigidly secured pinion 109 which is engaged by a rack or toothed bar 110 whose upper end is received by a guide 111 and whose lower end has a reduced extension 112 which extends through the member 34 mounted on the tubular standard A'. The lower end of the member 112 (Fig. 20) is threaded and equipped with a lock-nut 113 which forms a stop adapted to engage the lower surface of the member 34. The spring 114 tends to hold the plunger or rack-equipped bar 110 in its elevated position. The upper end of the guide 111 is fitted with a set-screw 115 adapted to engage the upper end of the member 110. When the cross-head descends, it carries with it the rack-bar 110 and rotates the shaft 105 in the direction opposite the direction indicated by the arrow in Fig. 31; and when the cross-head rises, the rack-bar rises and rotates the shaft in the direction indicated by the arrow in Fig. 31, thereby turning the star-wheel or pivot-wheel 104 and actuating the wheel 101. As will be understood from Fig. 29, the arrangement is such that the wheel 101 will be rotated during the final portion of the rotation of the wheel 104. The wheel 101, and hence the tool-head C', is normally locked against rotation by a spring-held pawl 116, as shown in Fig. 29. When the wheel 104 rotates in the direction shown by the arrow in Fig. 29, the stud 103 which served in the last rotation of the wheel 101, serves to disengage the pawl 116 before the next stud 103 engages the wheel 101. Thus it will be understood that the tool-head is locked against rotation during the stopping operation and is unlocked an instant before it is rotated on its own axis through an angle of 90°.

The device D which serves to receive the stoppers in bulk and deliver them to the feed-chute D' with the cork disks turned in the same direction, is described and claimed in Letters Patent No. 1,034,070, issued July 30, 1912. It will suffice to explain the device briefly. It comprises a rotary chamber 117 of hollow frusto-conical form which is rigidly mounted on a shaft 118 journaled in a stationary plate 119 which forms the large end of the chamber 117; a hopper 120 having one lateral wall cut away or open at 121 to admit the stoppers to the interior of the chamber 117; a plate 122 which is rigidly mounted on the shaft 118 and encircled by a flange 123 carried by the plate 119; a ratchet-wheel 124 secured to the shaft 118 and actuated by a pawl 125 mounted on a collar 126 journaled on the hub of the plate 119; and a connecting-rod 127 connected with an arm 128 of the collar 126 and having its lower end extending through a tubular member 129 (Fig. 18) which is joined, by a pivot 130, to the portion 28 of the cross-head C. A spring 131 is confined between the tubular member 129 and a collar with which the upper end of the connecting-rod 127 is equipped. When the cross-head C descends, the pawl 125 moves idly over the ratchet-wheel 124; and when the cross-head ascends, the spring 131 actuates the ratchet-wheel and rotates the chamber 117. The plate 122 which rotates with the shaft 118 is equipped on its inner face, near its periphery, with a series of permanent magnets 132 adapted to attract those stoppers which have their metal portions turned toward the plate 122 and carry them up to the admission end 133 of a curved chute 134 which constitutes an extension of the vertically disposed chute D', as shown in Fig. 33. The curved chute extends through the flange 123 of the plate 119, and its rear wall is constituted by the magnet-equipped inner surface of the plate 122. As the selected stoppers are carried through the chute 134 they are caused to slide gradually with relation to the magnets until they enter the straight portion of the chute.

The bottle-holding device E which is constructed to compensate automatically for bottles of unequal length, comprises a tubular bracket 135 (Figs. 2 and 14) which is firmly secured to the lower portion of the tubular standard A'; a tubular member 136 surmounting the member 135 and fixedly secured to said tubular standard; a guide member 137 carried by the frame at a lower point; a tubular member 138 slidable through the members 135 and 136 and having at its lower end a reduced extension 139 slidable in the bearing 137; a main-spring 140 confined between a shoulder at the upper end of the extension 139 and the member 137, the spring 140 serving in the stoppering operation; a plunger 141 movable in the sleeve 138 and having its lower end equipped with a rod 142 which extends through a perforation in a transverse wall 143 with which the member 138 is provided, the rod 142 being equipped beneath the wall 143 with a lock-nut 144; a relatively light tension-spring 145 confined between the wall 143 and the shoulder 146 with which the member 141 is equipped; a bottle-supporting head 147 mounted on a stem 148 adjustably connected with the plunger 141; a clamping-ring 149 encircling the plunger 141 and contained within a recess with which the member 138 is provided internally at its upper portion, said clamping-ring being provided, as shown in Fig. 15, with projections or cam-lugs 150, through which extends a rock-shaft 151 equipped with cams 152 which engage the cam 150; and an actuating lever 153 fixedly secured to the shaft 151, and projecting into a slot 154 with which the plunger B' is provided near its lower end, as shown in Fig. 14. The lower end of the extension 139 of the member 138 is equipped with a rod or stem 155 which extends through a perforation in the lower end of the member 137 and is equipped with a lock-nut 156 which serves as a stop, limiting the upward movement of the member 138 under the action of the spring 140. The member 138 is also provided with an outer tubular extension 157 which houses the spring 140 and has its lower end movable in an annular recess 158 with which the member 137 is provided. The bottle-supporting head 147 comprises an up-flanged disk 159 having on its lower side a hub which is securely fastened to the upper end of the adjusting stem 148; a freely movable down-flanged disk, or plate, 160 equipped on its upper surface with a resilient pad 161, which may be of rubber, and an anti-friction bearing-device interposed between the plate 160 and the plate 159, and comprising a disk 162 having an annular series of openings and serving to space the anti-friction balls 163. The plate 162 is shiftably connected with the plate 160 by means of a flanged screw 164 which extends freely through a central opening 165 with which the plate 162 is provided.

It will now be understood that the plate 160 is laterally shiftable, which is of importance in permitting bottles which are not perfectly true, such as bottles which are somewhat warped, to adjust themselves with relation to the stoppering device. When the cross-head C descends, the first effect of the pressure on the device E is to depress the plunger 141, the relatively light spring 145 being compressed to permit the member 141 to slide in the member 138. During this action, the device adjusts itself to bottles of varying length; and in the final portion of the descent of the cross-head, the plunger B', acting upon the lever 153, causes the inner member 141 to be clamped by the ring 149, so that in the final operation the member 141 and the member 138 will move as a unit, thus compressing the main-spring 140, which serves in the stoppering operation. Thus the spring 140 will always be subjected to a predetermined pressure, even though the bottles may vary in length, so that just the requisite amount of pressure will be used in the stoppering operation, thereby obviating the danger of breakage of the bottles.

The operation may be briefly summarized.

The operator places a bottle 43 on the bottle-supporting device E, and trips the foot-pedal 19, thereby withdrawing the dog 13 and permitting the key 11 to be forced into engagement with one of the slots in the hub of the pulley 3. Thereupon the shaft 2 makes a complete revolution and comes to rest. In this operation, the plunger B' is drawn downwardly, carrying with it the cross-head C on which is mounted the stoppering-tool-head C'. The downwardly presented stoppering-tool may be assumed to have been previously supplied with a stopper; and during the descent of the cross-head the bottle-mouth engages the conical surface 63 of the bottle-centering member 62, while the tool, continuing to descend, forces a stopper into the bottle-mouth. When the cross-head C ascends, the tool-head is unlocked in the final portion of this movement and caused to rotate through the medium of the star-wheel 104 and attendant parts. When the cross-head reaches the upper end of its traverse, it actuates the escapement D², permitting a stopper to drop into the sleeve 76; and in the descent of the cross-head the lever 83 is actuated through the medium of the cam 87, thereby causing the stopper to be delivered to the adjacent horizontally disposed idle tool. Thus, at each descent of the cross-head a stopper is delivered to an idle tool, while a previously supplied tool operates to insert a stopper into the mouth of a bottle.

The foregoing detailed description has been given for clearness of understanding only, and no undue limitation should be understood therefrom, but the appended claims should be construed as broadly as permissible in view of the prior art.

What I regard as new and desire to secure by Letters Patent is:—

1. In a machine of the character set forth, the combination of a bottle-support, a vertically reciprocating cross-head, a tool-head revolubly mounted thereon and equipped with a plurality of seal-applying tools, means carried with said cross-head for delivering seals to said tools, and means for delivering seals to said last-named means when the cross-head is in the elevated position.

2. In a machine of the character set forth, the combination of a bottle-support, a vertically reciprocable slide, a revoluble tool-head mounted thereon and equipped with a plurality of seal-applying tools, means for feeding seals to the tools, and tool-head rotating and locking means mounted on said slide.

3. In a machine of the character set forth, the combination of a frame, a vertically reciprocable cross-head mounted thereon, a tool-head rotatably mounted on said cross-head, a shaft journaled in said cross-head, means for communicating motion from said shaft to said tool-head, a rack serving to actuate said shaft, a seal-feeding device mounted on the cross-head, and a stationarily mounted device for feeding seals to said first-named seal-feeding device.

4. In a machine of the character set forth, the combination of a frame, a vertically reciprocable cross-head formed with a housing, a rotary tool-head mounted in said housing and equipped with a plurality of seal-applying tools, means for reciprocating the cross-head, a device for feeding seals to the tools, means operative to hold the tool-head locked during its descent and to rotate it during its ascent, and bottle-supporting means.

5. In a machine of the character set forth, the combination of a frame, a bottle-support, a reciprocable cross-head formed with a housing, a revoluble tool-head mounted in said housing and equipped with seal-applying tools, tool-head rotating and locking means within the housing, means carried by the frame for actuating the tool-head rotating means, seal-feeding means mounted on the cross-head and equipped with an actuating lever, a stationary cam co-acting with said lever, and means for delivering seals to said seal-feeding device when the cross-head is in its elevated position.

6. In a machine of the character set forth, the combination of a frame, a bottle-support, a vertically reciprocable cross-head having a housing having an opening in its lower part with bottle-mouth centering means thereat, a revolubly mounted tool-head in said housing equipped with a plurality of seal-applying tools, means for rotating the tool-head, means for locking the tool-head with one seal-applying tool depending vertically, and means for feeding seals to another seal-applying tool while the tool-head is locked against rotation.

7. In a machine of the character set forth, the combination of a frame, a bottle-support, a vertically reciprocable cross-head having a housing equipped in alinement with the bottle-support with a bottle-mouth centering device, a rotary tool-head in said housing equipped with a plurality of radially disposed seal-applying tools, means for rotating the tool-head and for locking it during the stoppering operation, and means for feeding a seal to an idle seal-applying tool.

8. In a machine of the character set forth, the combination of a frame, a bottle-support, a vertically reciprocable cross-head having a housing equipped in alinement with the bottle-support with a bottle-mouth centering device, a rotary tool-head in said housing equipped with a plurality of radially disposed seal-applying tools, means for rotating the tool-head and for locking it during the stoppering operation, and means mounted on the cross-head and operative to feed a seal to a tool during the descent of the cross-head.

9. In a machine of the character set forth, the combination of a frame, a bottle-support, a reciprocable cross-head, a revoluble tool-head mounted thereon, means for rotating the tool-head and for locking it against rotation during the stoppering operation, a seal-feeding device mounted on the cross-head, means for actuating said device during the descent of the cross-head, and seal-selecting and feeding mechanism, including a chute equipped at its lower end with an escapement adapted to be actuated by the cross-head when it rises.

10. In a machine of the character set forth, the combination of a frame, a bottle support, a reciprocable cross-head provided with a housing having a bottle-mouth centering device at its lower part and having a seal-inlet separated therefrom by an arc, a tool-head revolubly mounted in said housing and equipped with a plurality of radially disposed, seal-applying tools, a guide mounted on said cross-head adjacent said seal-inlet, a tubular seal-holder movable in said guide, a reciprocable seal-feeding plunger therein, and means for actuating said tubular seal-holder and said plunger.

11. In a machine of the character set forth, the combination of a frame, a bottle support, a reciprocable cross-head provided with a housing, a tool-head revolubly mounted in said housing and equipped with a plurality of seal-applying tools, means for rotating the tool-head, means for locking the tool-head during the stoppering operation, a seal-holder and seal-feeding plunger mounted on said cross-head and having a differential movement, and means for actuating said seal-holder and plunger during the descent of the cross-head.

12. In a machine of the character set forth, the combination of a frame, a bottle support, a reciprocable cross-head, a tool-head revolubly mounted therein and equipped with a plurality of seal-applying tools, a tubular seal-receiving tube reciprocably mounted on the cross-head and provided in its upper side with a slot through which seals may enter, a plunger mounted in said tubular seal-holder, means mounted on the cross-head for imparting differential reciprocation to said seal-holder and plunger, and co-acting stationarily-mounted actuating means.

13. In a machine of the character set forth, the combination of a frame, a bottle-support, a cross-head, a tool-holder revolubly mounted on said cross-head and equipped with a plurality of seal-applying tools, an actuating-wheel for said tool-holder provided with a plurality of peripherally-opening cam-slots, a wheel provided with studs co-acting with said cam-slots, and means for actuating said last-named wheel during the ascent of the cross-head.

14. In a machine of the character set forth, the combination of a frame, a bottle-support, a cross-head, a tool-holder revolubly mounted on said cross-head and equipped with a plurality of seal-applying tools, an actuating-wheel for said tool-holder provided with a plurality of peripherally-opening cam-slots, a locking-pawl for said wheel, a wheel provided with studs co-acting with said cam-slots and with said pawl, and means for actuating said last-named wheel during the ascent of the cross-head.

15. In a machine of the character set forth, the combination of a frame, a bottle-support, a reciprocable cross-head, means for reciprocating said cross-head, a tool-holder revolubly mounted on said cross-head and equipped with a plurality of seal-applying tools, a wheel serving to rotate the tool-head, a shaft serving to actuate said wheel, a rack serving to actuate said shaft, and a ratchet device constructed and arranged to cause rotation of the tool-head only during ascent of the cross-head.

16. In a machine of the character set forth, the combination of a frame, a bottle-support, a rack-bar mounted on the frame, a reciprocable cross-head, a tool-head revolubly mounted on said cross-head, a shaft equipped with a pinion meshing with said rack, means for communicating motion from said shaft to said tool-head, and means for locking the tool-head during its descent.

17. In a machine of the character set forth, the combination of a frame, a bottle-support, a spring-held rack-bar adjustably connected with said frame, a reciprocable cross-head, a tool-head revolubly mounted on said cross-head and equipped with a plurality of seal-applying tools, means carried with the cross-head for depressing said rack-bar, means for communicating rotary motion from the rack-bar to the tool-head during the ascent of the rack-bar, and means for locking the tool-head against rotation during its descent.

18. In a machine of the character set forth, the combination of a frame, a bottle-support, a vertically reciprocable cross-head having a housing provided in its lower portion with a guide and seat, a bottle-mouth centering device normally resting on said seat and provided with a concave lower surface, springs confined between said device and said housing, a tool-head revolubly mounted in said housing and equipped with a plurality of seal-applying tools, means for rotating the tool-head, and means for locking the tool-head.

19. In a machine of the character set forth, the combination of a frame, a bottle-support, a vertically reciprocable cross-head, a tool-holder revolubly mounted therein and equipped with a plurality of seal-applying tools, a guide mounted on said cross-head, a spring-held tubular seal-holder reciprocable in said guide and equipped with means for limiting its inward movement, a plunger in said seal-holder, a spring confined between said plunger and said tubular seal-holder, a common actuating lever for said seal-holder and plunger, and a stationarily mounted cam co-acting with said lever.

20. In a machine of the character set forth, the combination of a frame, a seal-applying tool, means for reciprocating the same, including a vertically movable plunger, and a self-adjusting bottle-supporting device comprising a vertically slidable tubular member, a main-spring supporting the same, an inner plunger, a lighter spring supporting said plunger and itself supported by said tubular plunger, a clamping device interposed between said tubular plunger and the inner plunger, said clamping device actuated by said first-named plunger in its descent, and a bottle-supporting head mounted on said inner plunger.

21. In a machine of the character set forth, the combination of a frame having a tubular standard, a plunger movable in said standard, a seal-applying tool carried by the upper end of said plunger, and a self-adjusting bottle-supporting device comprising a guide connected with the lower portion of the frame, a tubular member movable in said guide, a main-spring supported on the frame and supporting said tubular member, a lighter spring in said tubular member and supported thereby, an inner plunger supported by said lighter spring and equipped with a bottle-supporting head, a clamping-ring encircling said inner plunger and contained in a recess with which said tubular member is provided, said clamping-ring having perforate cam-equipped projections, a rock-shaft mounted in said projections and equipped with cams, and an actuating lever for said rock-shaft adapted to be actuated by said first-named plunger.

22. In a machine of the character set forth, the combination of a frame having a tubular standard, a plunger movable in said standard, a seal-applying tool carried by the upper end of said plunger, and a self-adjusting bottle-supporting device comprising a guide connected with the base portion of the frame, a tubular member equipped with a depending stem having means for limiting its upward movement, a main-spring supporting said tubular member, an inner plunger movable in said tubular member and equipped with a depending stem having means for limiting the upward movement with relation to said tubular member, a lighter spring confined between said inner plunger and the wall of said tubular member, a bottle-supporting head carried by said plunger, a clamping-ring interposed between said tubular member and said inner plunger, and means actuated by said first-named plunger and serving to clamp said ring on said inner plunger.

23. In a machine of the character set forth, the combination with a frame, a seal-applying tool, a bottle-supporting device comprising a revoluble hub having an up-flanged disk, a freely movable down-flanged disk above said first-mentioned disk, a plate between said disks provided with a central slot and an annular series of openings, anti-friction balls seated in said annular openings, means extending through the slot in the plate to movably connect same with said upper disk, and means for producing relative reciprocation between said tool and bottle-supporting device.

HARRY M. BROWN.

In presence of—
 CLAYTON F. McKENLY,
 F. L. COOK.